United States Patent

Kamens

[11] Patent Number: 5,206,639
[45] Date of Patent: Apr. 27, 1993

[54] SINGLE ANTENNA DUAL FREQUENCY TRANSPONDER

[75] Inventor: Bruce Kamens, Thomaston, Conn.

[73] Assignee: Timex Corporation, Middlebury, Conn.

[21] Appl. No.: 604,044

[22] Filed: Oct. 25, 1990

[51] Int. Cl.$^5$ .......................... H04B 1/59; H04B 1/44
[52] U.S. Cl. ................. 340/825.54; 343/876; 455/82; 455/83; 340/825.72
[58] Field of Search ............... 340/825.54, 825.72; 342/44, 51; 455/82, 83; 343/876

[56] References Cited

U.S. PATENT DOCUMENTS

| | | | |
|---|---|---|---|
| 2,779,908 | 1/1957 | Martin | 323/355 |
| 2,894,258 | 1/1959 | Vantine, Jr. et al. | 342/42 |
| 3,117,241 | 1/1964 | Paynter et al. | 307/254 |
| 3,327,215 | 1/1967 | Battin et al. | 455/80 |
| 3,449,674 | 1/1969 | Pace | 455/83 |
| 3,562,557 | 2/1971 | Gates | 307/255 |
| 3,752,960 | 8/1973 | Walton | 235/439 |
| 3,766,523 | 1/1973 | Brocker et al. | 340/825.75 |
| 3,842,246 | 10/1974 | Kohler et al. | 235/439 |
| 3,859,624 | 1/1975 | Kriofsky et al. | 340/941 |
| 3,959,746 | 5/1976 | Straw | 333/17.3 |
| 3,967,202 | 6/1976 | Batz | 342/42 |
| 3,988,675 | 10/1976 | Dykas | 455/78 |
| 4,037,177 | 7/1977 | Tyrey | 333/32 |
| 4,055,807 | 10/1977 | Priniski et al. | 455/83 |
| 4,065,753 | 12/1977 | Paul, Jr. | 340/825.54 |
| 4,087,791 | 5/1978 | Lemberger | 340/825.54 |
| 4,170,756 | 10/1979 | Shepperd | 455/82 |
| 4,233,607 | 11/1980 | Sanford | 343/700 MS |
| 4,236,068 | 11/1980 | Walton | 235/380 |
| 4,239,989 | 12/1980 | Braider | 307/255 |
| 4,242,602 | 12/1980 | Nakagawa | 307/516 |
| 4,251,797 | 2/1981 | Bragas | 340/905 |
| 4,253,035 | 2/1981 | Amitay | 307/27 D |
| 4,259,599 | 3/1981 | Takada | 307/255 |
| 4,260,983 | 4/1981 | Falck et al. | 340/572 |
| 4,277,837 | 7/1981 | Stuckert | 364/408 |
| 4,282,448 | 8/1981 | Wada | 307/273 |
| 4,298,793 | 11/1981 | Melis et al. | 235/487 |
| 4,331,886 | 5/1982 | Perner et al. | 307/27 D |
| 4,333,072 | 6/1982 | Beigel | 340/825.54 |
| 4,345,164 | 8/1982 | Gies | 307/255 |
| 4,364,043 | 12/1982 | Cole et al. | 342/44 |

(List continued on next page.)

FOREIGN PATENT DOCUMENTS

| | | | |
|---|---|---|---|
| 61-171233 | 8/1986 | Japan | 455/82 |
| WO8704865 | 8/1987 | PCT Int'l Appl. | |
| 1321734 | 6/1973 | United Kingdom | |

OTHER PUBLICATIONS

Friedman, Herb; "Antenna Duplexer"; *Electronics Illustrated*; (Mar. 1962) pp. 67 and 108.

*Primary Examiner*—Donald J. Yusko
*Assistant Examiner*—Andrew M. Hill
*Attorney, Agent, or Firm*—William C. Crutcher

[57] ABSTRACT

A single antenna, dual frequency transponder is provided. The transponder includes the antenna, first and second capacitors, a microprocessor/coder for generating a first and second control signals, and a logic circuit which uses the two control signals as inputs and depending on the state of the second control signal either provides an open circuit or a frequency signal at its output node. When the second control signal is a dormant (inhibit) signal, an open circuit is provided. As a result, the capacitors and the antenna provide a first tuned LC circuit which will receive an incoming signal at a desired first frequency. The incoming signal thereby resonates the LC circuit which provides a wake-up signal to the microprocessor/coder. In turn, the microprocessor/coder generates the first control signal of a desired second frequency. In turn, the logic circuit provides a related signal of the same second frequency as an output. With such an output, one of the two capacitors is effectively eliminated from the circuit, and the remaining capacitor and the antenna constitute a second tuned LC circuit which is tuned to the second frequency. By providing adjustable capacitance capacitors, the circuit is adjustable to desired incoming and outgoing frequencies.

18 Claims, 1 Drawing Sheet

U.S. PATENT DOCUMENTS

| | | | |
|---|---|---|---|
| 4,378,918 | 4/1983 | Miller, Jr. et al. | 244/3.11 |
| 4,399,437 | 8/1983 | Falck et al. | 340/825.54 |
| 4,399,557 | 8/1983 | Muszkiewicz | 455/82 |
| 4,459,590 | 7/1984 | Saulnier | 340/825.54 |
| 4,471,356 | 9/1984 | Gidl | 340/825.54 |
| 4,514,731 | 4/1985 | Falck et al. | 340/825.54 |
| 4,517,563 | 5/1985 | Diamant | 340/825.54 |
| 4,542,532 | 9/1985 | McQuilkin | 455/78 |
| 4,549,176 | 10/1985 | Kreft | 340/825.31 |
| 4,602,253 | 7/1986 | Kreft | 340/825.72 |
| 4,612,669 | 9/1986 | Nassen | 455/123 |
| 4,630,044 | 12/1986 | Polzer | 340/825.72 |
| 4,637,035 | 1/1987 | Betts | 375/8 |
| 4,656,472 | 4/1987 | Walton | 340/825.72 |
| 4,673,831 | 6/1987 | Reppen | 307/300 |
| 4,677,688 | 6/1987 | Yoshihara et al. | 455/82 |
| 4,678,939 | 7/1987 | Laue | 307/445 |
| 4,714,925 | 12/1987 | Bartlett | 340/825.55 |
| 4,736,196 | 4/1988 | McMahon et al. | 340/573 |
| 4,739,516 | 4/1988 | Starkloff et al. | 455/269 |
| 4,786,903 | 11/1988 | Grindahl et al. | 340/825.54 |
| 4,817,196 | 3/1989 | MacNak et al. | 455/193.1 |
| 4,819,860 | 4/1989 | Hargrove et al. | 340/573 |
| 4,857,893 | 8/1989 | Carroll | 340/825.54 |
| 4,864,292 | 9/1989 | Nieuwkoop | 340/825.54 |
| 4,888,585 | 12/1989 | Kamiya et al. | 340/825.54 |
| 4,893,118 | 1/1990 | Lewiner et al. | 340/825.54 |
| 4,963,880 | 10/1990 | Torre et al. | 343/876 |

SINGLE ANTENNA DUAL FREQUENCY TRANSPONDER

BACKGROUND OF THE INVENTION

This invention generally relates to single antenna transponders. More particularly, the invention relates to extremely compact single antenna dual frequency transponders which may be incorporated into a wrist instrument or a card for security or identification.

Transponders which incorporate a receiver and a transmitter are becoming increasingly used in numerous applications. Some of the more common applications include security applications where only certain equipment, or users of certain equipment may gain access to particular locations if the equipment can recognize an interrogating signal and provide an acceptable response. Examples of the transponders of the art may be seen with reference to U.S. Pat. No. 3,752,960 to Walton, U.S. Pat. No. 4,260,983 to Falck et al., and U.S. Pat. No. 4,399,437 to Falck et al. While the transponders of the art are effective for their particular purposes, they suffer from various drawbacks. In particular, many of the transponders of the art which receive at one frequency and transmit at another frequency require two or more antennae as is required in the above-listed patents. The use of two or more antennae, however, causes the transponders to be larger than what is optimal for certain applications such as wrist instruments.

SUMMARY OF THE INVENTION

It is therefore an object of the invention to provide a dual frequency transponder which utilizes a single antenna.

It is a further object of the invention to provide a single antenna, tunable, dual frequency transponder useful for security purposes.

It is another object of the invention to provide a dual frequency transponder which is implementable in a wrist instrument.

In accord with the objects of the invention, a transponder is provided and is comprised of an antenna, first and second capacitors, a coding means which generates two control signals, and a logic circuit which uses the two control signals as inputs and depending on the states of the control signals either provides an open circuit or a frequency signal at its output node. The output node of the logic circuit is coupled to a first plate of the first capacitor and a second plate of the second capacitor. The second plate of the first capacitor is coupled to the antenna and to an input of the coding means, while the first plate of the second capacitor is coupled to ground. The two control signals generated by the coding means include an inhibit signal and a frequency signal.

In its dormant state, the coding means generates an inhibit signal that is provided to the logic means which resultingly generates an open circuit at its output node. With an open circuit coupled to the first plate of the first capacitor and the second plate of the second capacitor, the first and second capacitors are in series with the antenna. Thus, a first LC circuit tuned according to the values of the inductance of the antenna and the capacitances of the capacitors is provided. If a signal of a frequency to which the first LC circuit is tuned is received by the transponder, a sinusoidal voltage is generated across the antenna, and that voltage is processed and sent to the coder as a wake-up signal. In response, the coder provides the frequency signal to the logic circuitry which, in turn, provides that signal at its output node. With the output node of the logic circuitry no longer an open circuit, the second capacitor is effectively eliminated from the circuit. Thus, a second LC circuit which is preferably tuned to the frequency signal being generated by the coder and forwarded through the logic circuit is set up and is comprised of the first capacitor and the antenna only. The capacitances of the first and second capacitors are chosen carefully so that the transponder will "wake up" upon receipt of a signal of a first predetermined frequency and will respond with its own signal at a second predetermined frequency. By making the capacitors adjustable, different wake up and response frequencies can be chosen.

In accord with several preferred aspects of the invention, the coder is a microprocessor with associated clock circuitry, and the frequency signal provided by the coder is a pulse code modulated frequency signal. Also, the logic circuit is comprised of a plurality of logic gates, an npn transistor, and a pnp transistor, with the transistors coupled in a push-pull arrangement, and with the output node of the logic circuit at the collectors of the transistors.

Additional objects and advantages of the invention will become apparent to those skilled in the art upon reference to the detailed description taken in conjunction with the provided figure.

DETAILED DESCRIPTION OF THE PREFERRED EMBODIMENT

Figure 1:
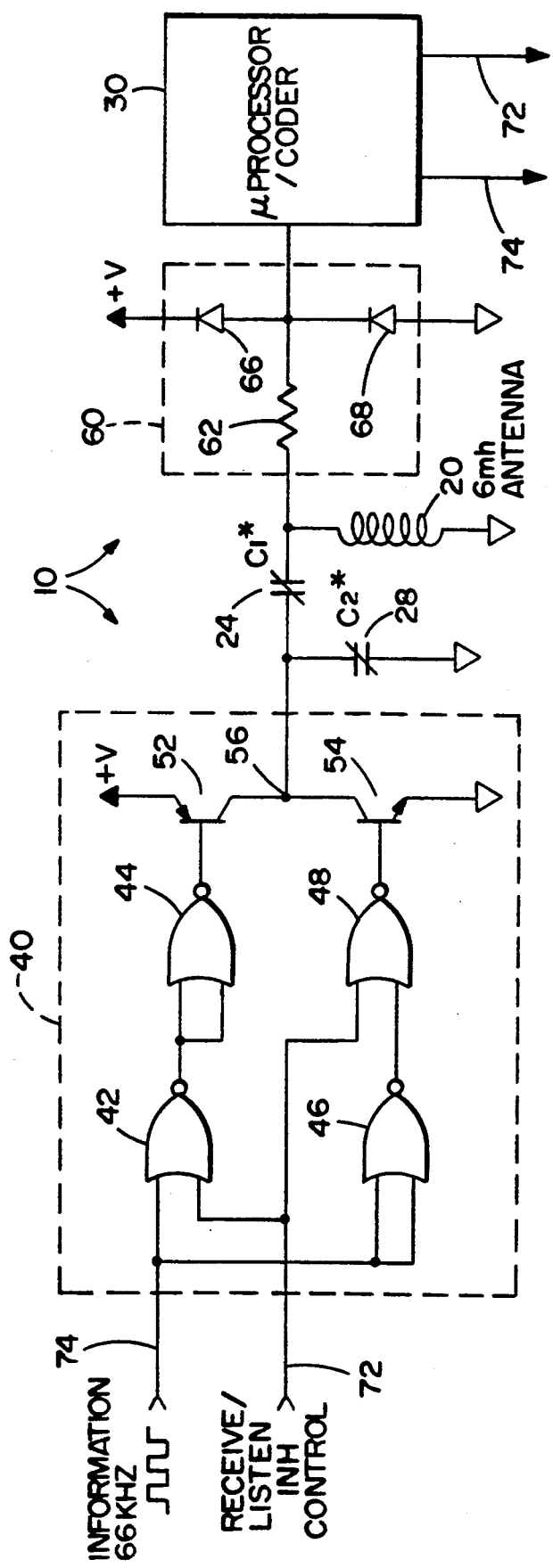
FIG. 1 is a partial circuit, partial block diagram of the single antenna, dual frequency transponder of the invention.

The preferred single antenna, dual frequency transponder 10 of the invention is seen with reference to FIG. 1. The transponder is comprised of an antenna 20, a first capacitor (C1) 24, a second capacitor (C2) 28, a microprocessor/coder 30, a logic circuit 40, and voltage regulating circuitry 60. As shown, the logic circuit 40 includes four NOR gates 42, 44, 46, and 48, a pnp transistor 52, and an npn transistor 54. The voltage regulating circuitry 60 includes a resistor 62, and two diodes 66 and 68.

The various components of the transponder 10 are arranged as follows. The logic circuit 40 is shown with two control inputs 72 and 74 which are received from the preferably battery powered microprocessor/coder 30. The first input 72 is the "inhibit" input which is fed to one of the inputs of each of NOR gates 42 and 48. The second input is a frequency signal which is fed to the other input of NOR gate 42 and to both inputs of NOR gate 46. The output of NOR gate 42 is fed to both inputs of NOR gate 44, while the output of NOR gate 46 is fed to the second input of NOR gate 48. In turn, the output of NOR gate 44 is coupled to the base of pnp transistor 52, while the output of NOR gate 48 is fed to the base of npn transistor 54. The collectors of transistors 52 and 54 are coupled together, with the emitter of pnp transistor 52 coupled to a high voltage rail, and the emitter of npn transistor 54 coupled to ground. The common collectors of transistors 52 and 54 are used as an output node of the logic circuit 40. Effectively, as described in more detail below, the logic circuit causes its output node to appear as an open circuit when it receives the inhibit control 72 from the battery powered microprocessor/coder 30, and causes a frequency signal to appear at its output node when the frequency signal 74 is received.

The common collector of transistors 52 and 54 (output node of the logic circuit 40) is coupled to a first plate of the preferably adjustable capacitance capacitor 24 and to a second plate of the preferably adjustable capacitance capacitor 28. The second plate of capacitor 24 is coupled to the antenna 20, while the first plate of capacitor 28 is coupled to ground. As will be described in more detail hereinafter, capacitors 24 and 28, in conjunction with antenna 20 provides two different tuned LC circuits, depending on the signal at the output node of the logic circuit 40.

The second plate of capacitor 24 is also coupled to resistor 62 of the voltage regulating circuitry 60. Resistor 62, in turn is coupled to an input port of the microprocessor/coder 30, the p terminal of diode 66 and to the n terminal of diode 68. The n terminal of diode 66 is coupled to the high voltage rail, while the p terminal of diode 68 is coupled to ground. As is hereinafter described, the resistor 62, and the diodes 66 and 68 condition the signal being received over the antenna 20 to provide a wake-up signal for the microprocessor/coder 30.

In its dormant or "sleeping" state, the microprocessor/coder 30 generates a logic high inhibit signal 72 which is provided to NOR gates 48 and 42 of the logic means 40. With a high input, NOR gate 48 provides a low output to the base of transistor 54. As a result, transistor 54 does not conduct. With a high input to NOR gate 42, NOR gate 42 provides a low output to both inputs or NOR gate 44. In turn, NOR gate 44 provides a high output to the base of transistor 56. When a high voltage is provided to the base of pnp transistor 52, transistor 52 does not conduct. Thus, with the inhibit signal 72 high, transistors 52 and 54 are turned off, effectively providing an extremely high impedance (i.e. resembling an open circuit) at the output node 56 of the logic circuit 40.

With an open circuit coupled to the first plate of the first capacitor 24 and the second plate of the second capacitor 28, the first and second capacitors are in series with the antenna 20. Thus, a first LC circuit tuned according to the values of the inductance (L) of the antenna 20 and the capacitances (C) of the capacitors 24 (C1) and 28 (C2) is provided. Generally, the resonating frequency of the circuit is defined according to:

$$\text{res. freq.} = \tfrac{1}{2}\sqrt{LC} \qquad (1)$$

where the capacitance C of series capacitors is defined by $$C = C1C2/(C1+C2) \qquad (2)$$

For example, where the capacitance of capacitor 24 is 969 picofarads, and the capacitance of capacitor 28 is 323 picofarads, the effective capacitance, according to equation (2) is 242 picofarads. With an antenna having a six millihenry inductance, the resonant frequency of the circuit according to equation (1) is approximately 132 kHz.

With the inductance and capacitances so set, if a 132 kHz signal is received by the transponder 10, a sinusoidal voltage is generated across the antenna 20. That sinusoid is processed (regulated) by regulator circuit 60 which includes a high impedance resistor 62 and diodes 66 and 68. The function of the regulator circuit 60 is to regulate the voltage generated by the resonance of the LC circuit so that it may be properly sent to the microprocessor/coder 30 as a wake-up or trigger signal. As shown in FIG. 1, the regulator circuit 60 clips at least the negative part of the sinusoid such that the signal presented to the microprocessor/comparator does not fall below $-0.7$ V; nor does it exceed $(+V)+0.7$ V or the supply voltage $+0.7$ V.

The microprocessor/coder 30 preferably includes a comparator (not shown) which senses the amplitude of the incoming signal. If the incoming signal exceeds a predetermined threshold, the received signal is considered a "wake-up" signal, and the microprocessor/coder 30 enters a routine which preferably utilizes clock circuitry (not shown) to generate a pulse code modulated (PCM) sinusoidal frequency control signal 74 which is provided to the logic circuit 40. When the PCM sinusoidal is provided to NOR gates 42 and 46 of the logic circuit 40, a similar signal is provided at the output node 56 of logic circuit 40. In particular, when the signal is high, NOR gate 42 provides a low output to the inputs of NOR gate 44. In turn, NOR gate 44 provides a high voltage to the base of transistor 52 which is turned off. Also, when the frequency signal 74 is high, NOR gate 46 is provided with two high inputs and provides a low output to NOR gate 48. In turn, NOR gate 48 provides a high output (the inhibit signal 72 having been turned off when the frequency signal 74 was turned on) to the base of transistor 54, turning transistor 54 on. With transistor 52 off, and transistor 54 on, the voltage at the output node is the low saturation voltage Vce (e.g. 0.3 V) across transistor 54. On the other hand, when the frequency signal 74 is low, NOR gate 42 provides a high output to NOR gate 44 which inverts the high signal and provides a low signal to the base of transistor 52. Also, with the frequency signal 74 low, NOR gate 46 provides a high signal to NOR gate 48 which provides a low signal to the base of transistor 54. With a low signal at the bases of transistors 52 and 54, transistor 52 turns on while transistor 54 turns off, and the voltage provided at the output node 56 is effectively the high voltage rail voltage minus Vce (e.g. 4.7 volts for a 5 V supply). Thus, when logic circuit 40 is receiving the frequency control signal 74, it provides at its output node 56 a similar signal, except that the voltage ranges from Vce to $(+V)-$Vce, and the signal is inverted.

With the output node of the logic circuitry 40 no longer an open circuit, the second capacitor 28 is effectively eliminated from the circuit. A second LC circuit, which is preferably tuned to the frequency signal being generated by the microprocessor/coder and forwarded through the logic circuit 40, is set up and is comprised of the first capacitor 4 and the antenna 20 only. With capacitor 24 having a capacitance of 969 picofarads, and antenna 20 having an inductance of six millihenries, the resonant frequency of the circuit according to equation (1) is approximately 66 kHz. Thus, the frequency control signal 74 generated by the microprocessor/coder is a 66 kHz signal so that the proper resonance is established which results in antenna 20 transmitting a signal.

Those skilled in the art will appreciate that the capacitances of the first and second capacitors are chosen carefully so that the transponder will "wake up" upon receipt of a signal of a first predetermined frequency and will respond with its own signal at a second predetermined frequency. By making the capacitors adjustable, different wake up and response frequencies can be set for a particular apparatus.

There has been described and illustrated herein a dual frequency transponder which utilizes a single antenna. While a particular embodiment has been described, it is not intended that the invention be limited thereby, as it is intended that the invention be as broad in scope as the art will allow. Thus, while the microprocessor/coder was described as generating a pulse code modulated signal, it will be appreciated that other types of coded or uncoded signals could be generated, provided, of course, that the signal provided is a signal which will cause the LC circuit to resonate at a desired frequency. Also, while the use of a microprocessor/coder was described, it will be appreciated that such a microprocessor/coder is used because the microprocessor is typically available due to other applications. Thus, if desired, a signal generating means which can generate an inhibit signal and which can also generate a desired frequency signal in response to a received signal could be utilized instead of the microprocessor/coder.

Further, while the logic circuit was described as comprised of a plurality of logic gates, an npn transistor, and a pnp transistor, with the transistors coupled in a push-pull arrangement, it will be appreciated that other circuitry and/or transistor types could be utilized; provided that what is generated at the output node of the logic circuit appears to be an extremely high impedance when the apparatus is in the dormant mode, and appears to be a low impedance frequency signal in the active mode of the apparatus. Likewise, while the regulator circuit was described as comprised of a high impedance resistor and two diodes, it will be appreciated that other circuitry could be utilized to regulate the voltage to supply a wake-up signal to the microprocessor. In fact, depending on the microprocessor or other signal generating means utilized, the regulating circuit might not be required at all or might be included in the signal generating means itself. Also, it will be apparent that while particular capacitor and inductor values where utilized to show a transponder which responds to a 132 kHz signal by transmitting at 66 kHz, capacitors and inductors of different capacitance and inductance could be utilized to provide a system which responds to any desired frequency with a signal of any other desired frequency. Therefore, it will be apparent to those skilled in the art that yet other changes and modifications may be made to the invention as described without departing from the spirit and scope of the invention as so claimed.

I claim:

1. A single antenna transponder comprising:
  a) signal generating means for generating a first signal of a first desired frequency in response to a trigger signal, and for generating a second control signal having first and second states, said signal generating means changing said second control signal from said first state to said second state after receiving said trigger signal;
  b) an antenna coupled to said signal generating means;
  c) logic control means coupled to said signal generating means, and including means for receiving said first signal and said second control signal, and having an output, wherein said logic control means includes means for generating a very high impedance at said output when said logic control means receives said first state of said second control signal, and wherein said logic control means includes means for providing a transmitting signal of said first desired frequency when said logic control means receives said first signal and said second state of said second control signal;
  d) a first capacitor having a first plate coupled to said output of said logic control means, and a second plate coupled to said antenna and to said signal generating means; and
  e) a second capacitor having a first plate coupled to a first fixed voltage, and a second plate coupled to said first plate of said first capacitor, wherein
  when said logic control means receives said first state of said second control signal and said output of said logic control means is at a very high impedance, said first capacitor, said second capacitor, and said antenna comprise a first tuned LC circuit for receiving an incoming signal at a second frequency from which said trigger signal is generated, and
  when said logic control means receives said second state of said second control signal, said output of said logic control means is at a low impendance, and said first capacitance and said antenna comprise a second tuned LC circuit for taking said transmitting signal at said first desired frequency and transmitting the same.

2. A transponder according to claim 1, wherein said logic control means comprises a first transistor and a second transistor, said first and second transistors having common collectors which constitute said logic control output, said first transistor and second transistors each having a base coupled to said means for receiving said first signal and said second control signal.

3. A transponder according to claim 2, wherein:
  said first transistor is a npn-type transistor, and said second transistor is a pnp-type transistor,
  each of said first transistor and second transistor has an emitter, and
  the emitter of said first transistor is coupled to said first fixed voltage, and the emitter of said second transistor is coupled to a second fixed voltage.

4. A transponder according to claim 3, wherein:
  said means for receiving said first signal and said second control signal comprises first, second, third, and fourth NOR gates,
  said first NOR gate has first and second input ports and an output port, and said first signal is coupled to said first input port of said first NOR gate and said second control signal is coupled to said second input port of said first NOR gate,
  said second NOR gate has at least one input port and an output port, and said output port of said first NOR gate is coupled to an input port of said second NOR gate, and said output port of said second NOR gate is coupled to said base of said second transistor,
  said third NOR gate has at least one input port and an output port, and said first signal is coupled to an input port of said third NOR gate,
  said fourth NOR gate has first and second input ports and an output port, and said second control signal is coupled to said first input port of said fourth NOR gate and said output port of said third NOR gate is coupled to said second input port of said fourth NOR gate, and said output port of said fourth NOR gate is coupled to said base of said first transistor.

5. A transponder according to claim 1, further comprising:
   f) voltage regulating means coupling said antenna to said signal generating means for regulating said incoming signal and generating therefrom said trigger signal.

6. A transponder according to claim 5, wherein:
   said voltage regulating means comprises a high impedance resistor coupled to said antenna and said signal generating means, and at least one diode connected to said high impedance resistor and to said signal generating means and to one of a second fixed voltage and said first fixed voltage.

7. A transponder according to claim 3, further comprising:
   f) voltage regulating means coupling said antenna to said signal generating means for regulating said incoming signal and generating therefrom said trigger signal.

8. A transponder according to claim 7, wherein:
   said voltage regulating means comprises a high impedance resistor coupled to said antenna and said signal generating means, and at least one diode connected to said high impedance resistor and to said signal generating means and to one of said second fixed voltage and said first fixed voltage.

9. A transponder according to claim 4, further comprising:
   f) voltage regulating means coupling said antenna to said signal generating means for regulating said incoming signal and generating therefrom said trigger signal.

10. A transponder according to claim 9, wherein:
    said voltage regulating means comprises a high impedance resistor coupled to said antenna and said signal generating means, and at least one diode connected to said high impedance resistor and to said signal generating means and to one of said second fixed voltage and said first fixed voltage.

11. A transponder according to claim 1, wherein:
    said first capacitor is an adjustable capacitance capacitor, and said second capacitor is an adjustable capacitance capacitor.

12. A transponder according to claim 3, wherein:
    said first capacitor is an adjustable capacitance capacitor, and said second capacitor is an adjustable capacitance capacitor.

13. A transponder according to claim 4, wherein:
    said first capacitor is an adjustable capacitance capacitor, and said second capacitor is an adjustable capacitance capacitor.

14. A transponder according to claim 11, wherein:
    said first frequency is different than said second frequency.

15. A transponder according to claim 1, wherein:
    said signal generating means is a microprocessor/coder for generating a coded oscillating first signal.

16. A transponder according to claim 3, wherein:
    said signal generating means is a microprocessor/coder for generating a coded oscillating first signal.

17. A transponder according to claim 4, wherein:
    said signal generating means is a microprocessor/coder for generating a coded oscillating first signal.

18. A method of receiving and transmitting information over a single antenna contained in a transponder having a signal generating means for generating a first signal and a second control signal, said second control signal having first and second states, where the signal generating means is coupled to said antenna, a logic circuit means including means for receiving said first signal and said second control signal, and providing an output in response thereto, a first capacitor coupled to said antenna and to said logic circuit means, and a second capacitor coupled to said logic circuit means and said first capacitor, said method comprising:
    a) generating with said logic circuit at the output thereof a high impedance when said logic circuit receives said second control signal in said first state from said signal generating means, said high impedance causing said first capacitor, second capacitor, and antenna to constitute a first tuned LC circuit tuned to a first frequency;
    b) receiving at said antenna a signal at said first frequency, said tuned LC circuit resonating in response thereto to provide a voltage signal;
    c) applying a signal related to said voltage signal to said signal generating means;
    d) in response to step c), changing said second control signal from said first state to said second state, and generating with said signal generating means said first signal of a second frequency, whereby said logic circuit provides at the output thereof a transmittal signal of said second frequency, and wherein when said second state of said second control signal is generated by said signal generating means, said output of said logic circuit is at a low impedance and said first capacitor and antenna constitute a second tuned LC circuit tuned to said second frequency;
    e) transmitting said transmittal signal via said antenna.

* * * * *